Sept. 23, 1969     K. RUSHING ETAL     3,468,379

AUTOMATIC FARMING APPARATUS

Filed March 3, 1966     4 Sheets-Sheet 1

INVENTORS
JOHN CLARENCE ALLEN, JR
KARL RUSHING

BY   *Darby & Darby*

ATTORNEYS

INVENTORS
JOHN CLARENCE ALLEN, JR.
KARL RUSHING
BY:
ATTORNEYS

Sept. 23, 1969  K. RUSHING ETAL  3,468,379
AUTOMATIC FARMING APPARATUS
Filed March 3, 1966  4 Sheets-Sheet 4

INVENTORS
JOHN CLARENCE ALLEN, JR.
KARL RUSHING
BY:
*Darby & Darby*
ATTORNEYS

United States Patent Office 3,468,379
Patented Sept. 23, 1969

3,468,379
AUTOMATIC FARMING APPARATUS
Karl Rushing and John Clarence Allen, Jr., Indianola, Miss.; said Rushing assignor to said John C. Allen, Jr., and Roy R. Brashier, Indianola, Miss.
Filed Mar. 3, 1966, Ser. No. 531,603
Int. Cl. A01b 69/04
U.S. Cl. 172—2                                      4 Claims

ABSTRACT OF THE DISCLOSURE

Automatic farming apparatus wherein a tractor pulling a plow or the like is adapted to trace a part defined by buried conductors and wherein a separate conductor is buried along the edges of the field for the purpose of controlling the turning of the vehicle, includes a digital control system in which the operation of the vehicle steering means, the vehicle throttle, the implement positioning means, etc. is controlled by preselected combinations of control pulses which may be generated upon crossing of the control wire or by a radio receiver responsive to a plurality of separate frequencies. The construction is such that the same control system may be used when tracing the buried conductor, or in controlling the tractor in response to remote radio signals.

---

This invention relates to farming apparatus, and in particular to automatic, remote controlled farming equipment.

Various techniques have been proposed to automatically control a tractor or the like and its associated farming implements without requiring human control. For example, Patents No. 2,842,039 and 3,169,598 show developments in this particular art wherein the tractor follows a path defined by a buried conductor. In both instances, the farming implement may be raised and lowered at the edges of the field. Neither patent, however, discloses a fully automatic farming apparatus in that some form of human intervention is required to properly situate the tractor with respect to the buried conductors, and, in each case, by the nature of the apparatus, the inventions would not readily lend themselves to the simultaneous use of plurality of tractors.

Accordingly, the main object of the present invention is to provide an improved fully automatic farming system.

A more specific object of the invention is to provide automatic farming apparatus adapted to trace a preselected path, wherein the individual tractors or vehicles may be remotely controlled via a radio link so that they may be fully controlled through the tracing circuits.

Another object of the invention is to provide a fully automatic farming apparatus of the type described, wherein a plurality of tractors or other such vehicles may be used, and wherein the amount of wire required is substantially reduced.

Figure 1:
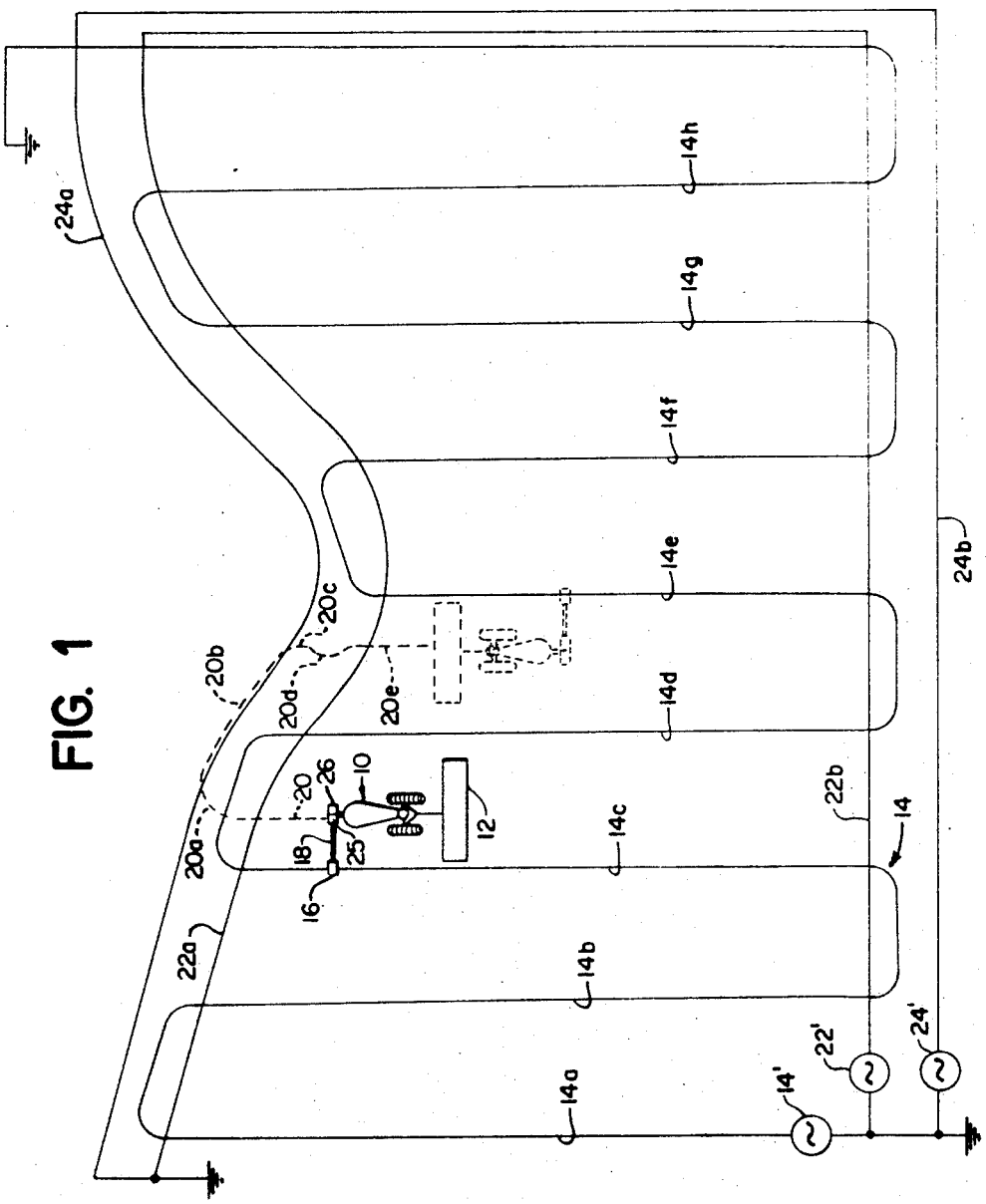
Figure 2:
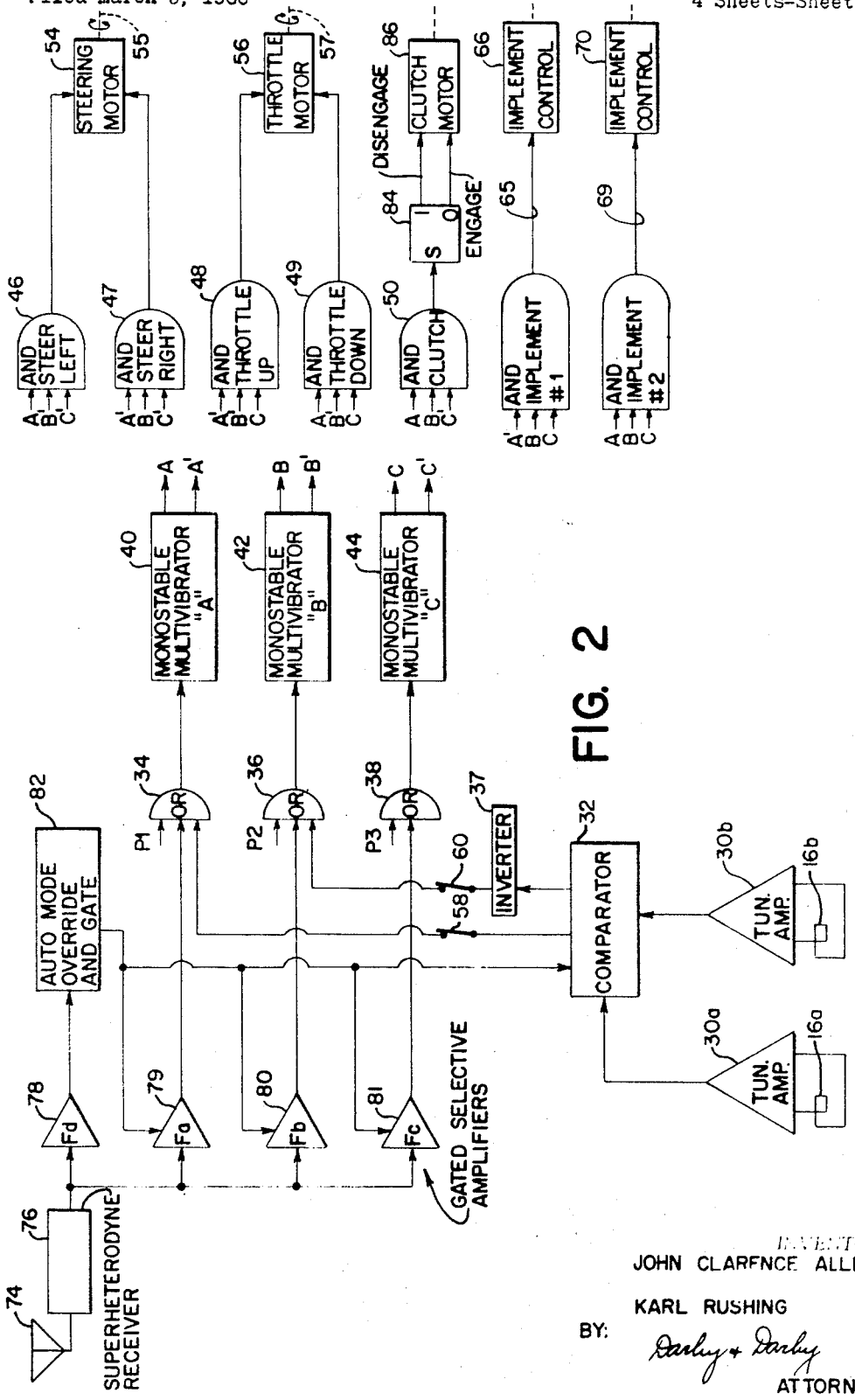
Figure 3:
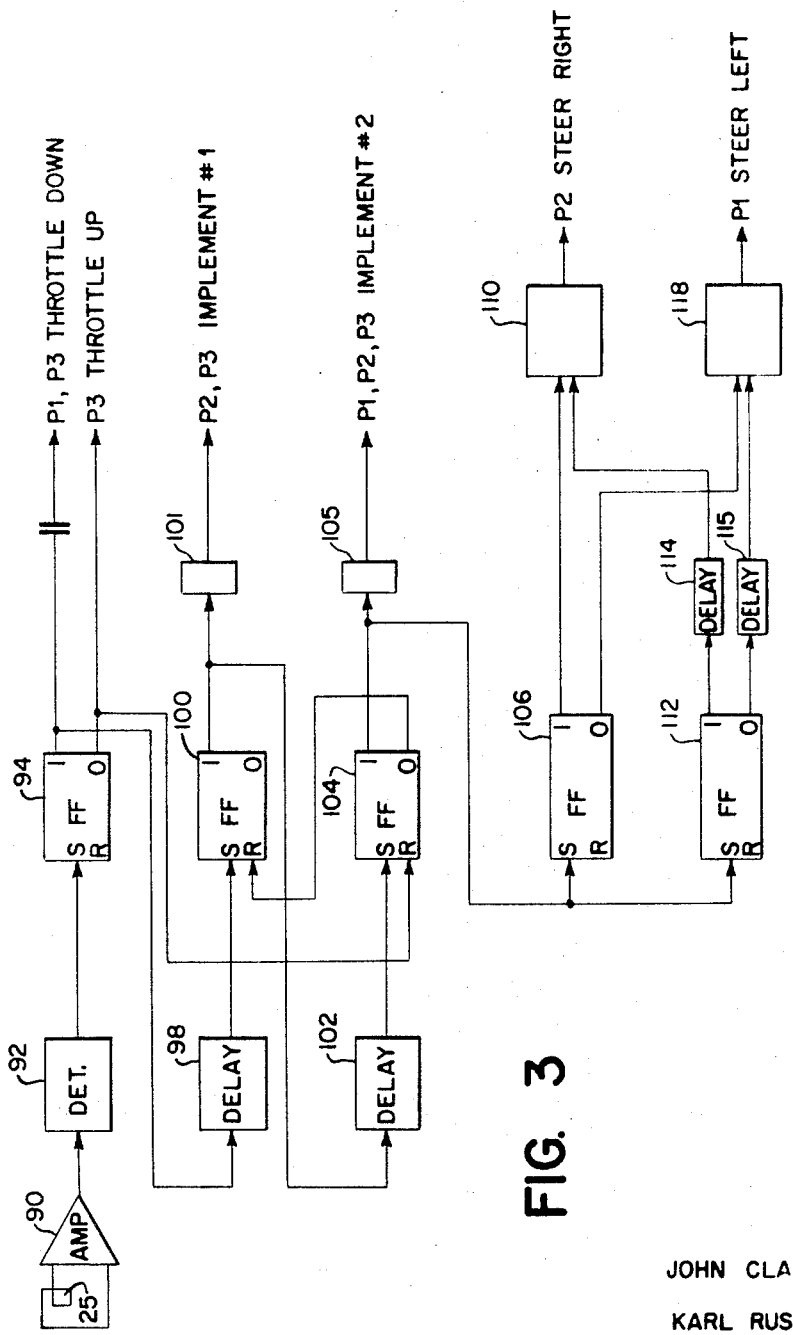
Figure 4:
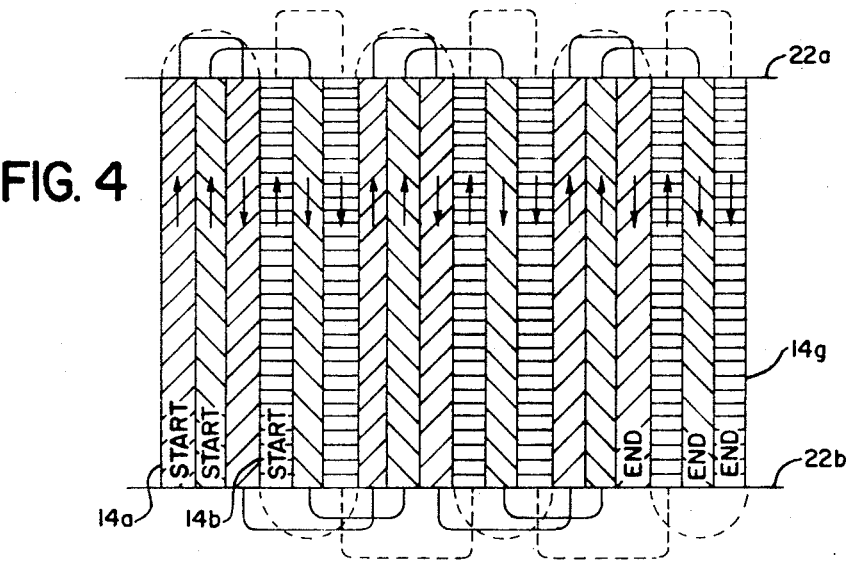
Figure 5:
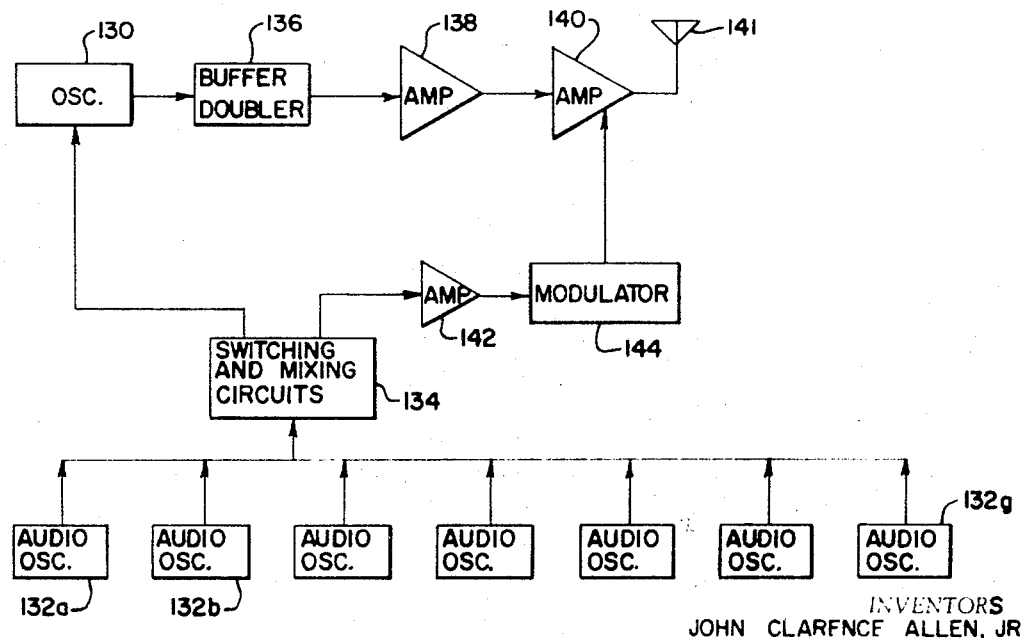

In the drawings:
FIGURE 1 is a schematic illustration explaining the operation of the invention;
FIGURE 2 is a block diagram of the control circuit used in a preferred embodiment of the invention;
FIGURE 3 is a block diagram of a preferred embodiment of the program pulse generator;
FIGURE 4 shows how three tractors could be used to farm a given area in accordance with the invention; and
FIGURE 5 is a block diagram of a transmitter which can be used for remote control purposes.

Referring to FIGURE 1, there is illustrated a schematic diagram of the wires as they would actually be placed on a representative farm. The tractor or other vehicle is shown generally at 10 pulling a farm implement 12 such as a plow. Obviously, the various parts are not drawn to scale. A first continuous wire 14 is laid out in serpentine fashion over the length of the field so as to form parallel rows of buried conductors shown as 14a, 14b, 14c, etc. The wire 14 is buried a sufficient distance beneath the surface so as not to be disturbed by implement 12.

Tractor 10 carries an antenna 16 mounted on a boom 18 extending from the front of tractor 10. As explained in detail below, antenna 16 picks up signals from wire 14 (14c in the illustrated case) which are used to maintain the tractor in a fixed position with respect to the tracing wire. Thus, tractor 10 will travel along the path indicated by dotted line 20 while pulling implement 12 through the field.

Two wires 22a and 22b are buried at opposite edges of the field so that each cross the parallel wires 14a, b, c, etc. A pair of third lines 24a and 24b, substantially parallel to lines 22a and 22b, respectively, are buried in the field slightly beyond the limits of the tracing line 14.

Conventional generators 14', 22' and 24' apply alternating voltages of various frequencies or tones to the respective lines 14, 22 and 24 for the required control of the tractor 10 and implement 12, and each time one of these signals is detected a new control function is accomplished as explained below. The following description with respect to FIGURE 1 is given in purely functional terms for explanatory purposes.

As tractor 10 proceeds along path 20 with antenna 16 over tracing line 14c, various steering servos maintain the tractor 10 in its properly aligned position so that implement 12 cuts a straight path across the field. When antenna 25 picks up the tone on line 22a (which differs from the tone on line 14) it causes a programmed turn sequence to be initiated depending upon the edge of the field which the tractor is approaching. In other words, if tractor 10 is traveling from bottom to top in FIG. 1, the signal on line 22a, when received, would override the signal on line 14 and cause the tractor to commence a ninety degree right turn as shown by the dotted line portion 20a. Prior to the turning operation the signal on line 22a causes a mechanism (not illustrated) to reduce the vehicle speed and lift the implement 12 out of the ground which, for known reasons, is desirable when the tractor is turning.

Tractor 10 includes a third antenna 26 which is designed to pick up the frequency applied to line 24a. The tractor seeks line 24a and commences to follow that line as shown at 20b. After a predetermined delay, which, as explained below, may readily be incorporated into the preferred embodiment of the invention, the control apparatus on the tractor causes the tractor to commence a ninety degree turn back toward the field along the path 20c. The tractor then commences to seek line 14e. In other words, antenna 16 is permitted to respond to the signal on line 14 so that the tractor will move on a path 20d toward the tracing line closest to it, which, in this example, is line 14e.

The tractor follows line 14e along path 20e until the signal on line 22b is received. At this point substantially the same operation as described above recurs with the initial programmed turn being to the left. Tractor 10 continues along the path defined by line 24b for a predetermined interval of time and then turns to the left to seek and follow line 14f.

This procedure continues until the entire area has been covered. Depending upon the number of tractors, the width of the implement, etc., more than one pass over the area may be required, but this will present no special problems, and representative examples are given below with reference to FIGURE 4.

FIGURE 2 is a block diagram of the circuits used to control the operation of the tractor. Antenna 16 may consist of two separate antenna coils 16a and 16b equidistantly arranged on opposite sides of the tracing wire 14. The RF energy picked up from the tracing line is coupled through respective tuned amplifiers 30a and 30b to a comparator 32. Comparator 32 compares the magnitudes of the signals from amplifiers 30a and 30b and, depending upon which is the greater, couples a D.C. signal to one of OR gates 34 or 36. In the latter case the signal is first coupled through an inverter 37 so that control signals of the same polarity are used. A third OR gate 38 serves a purpose described in detail below. OR gates 34, 36 and 38 are coupled to respective monostable multivibrators 40, 42 and 44.

With the circuit as so far described if, for any reason, the tractor should move from its predetermined course, an error signal is produced by comparator 32 since either antenna 16a or 16b will receive a stronger signal from wire 14. This error signal is coupled through one of OR gates 34 or 36 to the respective monostable multivibrator 40 or 42. As is well known, the outputs of multivibrators 40 and 42 (as well as 44) are single pulses initiated by an input to the multivibrator and lasting for a fixed time interval. In FIGURE 2, the pulse outputs of multivibrators 40, 42 and 44 appear on lines A, B and C, respectively, in response to an input from the associated OR gates 34, 36 and 38. When a pulse is present on lines A, B and C the voltage on the lines A', B' and C' is not present; at all other times the high voltage appears on lines A', B' and C'.

One of the two outputs of each of multivibrators 40, 42 and 44 are coupled to each of seven AND gates 46–52. To avoid unnecessarily complicating the drawing, the respective inputs to each of AND gates 46–52 are represented by the letters appearing at the outputs of multivibrators 40, 42 and 44.

AND gates 46 and 47 are coupled to a motor 54 which controls the steering mechanism of the tractor by means of shaft 55 through a suitable gear box (not shown). The motor will cause its shaft 55 to rotate clockwise or counter clockwise depending upon whether a signal is fed thereto from AND gate 46 or 47, so that the steering is suitably controlled to bring the tractor back onto the proper path. For example, assume that antenna 16a has received a stronger signal than that received by antenna 16b (indicating that the tractor has moved to the right and antenna 16a is closer to line 14). The comparator error signal will trigger multivibrator 40 applying a voltage on line A to AND gate 46. The other two inputs to gate 46 are B' and C' from multivibrators 42 and 44, respectively, which, as explained above, will be high in the absence of a triggering input. Accordingly, a signal is passed by gate 46 to the steering motor 54 causing shaft 55 to rotate in such a direction that the tractor is steered to the left. This operation continues as long as the comparator 32 produces an error signal, i.e. until the tractor is back on the proper path. When the motor is de-energized, conventional means (not shown) are actuated to return the steering to center.

In the same fashion a high voltage received by antenna 16b opens AND gate 47 to motor 54 causing shaft 55 to rotate so as to steer the tractor to the right. The threshold of the comparator 32 and the period of the multivibrator 40 are suitably correlated in a known manner so that no hunting can occur.

It is recalled that when the tractor crosses line 22a or 22b antenna 25 picks up a separate tone to initiate a programmed sequence of action. The manner in which the program is initiated is explained below with respect to FIGURE 3. For the present purposes, it is sufficient to know that OR gates 34, 36 and 38 are also responsive to three inputs labeled P1, P2 and P3. These three inputs correspond to the signals produced by the program unit, the effect of which on the control of the tractor is now explained.

Assume that the tractor has just traversed line 22b which, as shown in FIGURE 1, means that the tractor should turn to the left. As soon as the signal strength from line 22b reaches a predetermined magnitude, the program unit opens the circuit between comparator 32 and gates 34, 36 and 38. For example, the circuit may be opened by relay contacts 58 and 60 actuated in an obvious fashion. When the control is turned over to the program unit, voltages appear on lines P1 and P3 energizing multivibrators 40 and 44 through gates 34 and 38. Thus, enabling voltages appear on lines A, B', and C opening AND gate 49 and applying a signal to a reversible motor 56 which controls the throttle position by means of an output shaft 57. Since it is desired to reduce the speed of the tractor during the turning operation, AND gate 49 controls motor 56 such that shaft 57 is rotated to throttle down the engine of the tractor.

Shortly thereafter, the voltage is removed from P1, and energizing signals appear on lines P2 and P3 thus causing the miltivibrator outputs A', B, C to open AND gate 51 passing a signal on line 65 to a first implement control means 66 which causes the first implement to be lifted out of the ground. The implement control 66 will include means to retain the implement in a raised position despite the subsequent opening of AND gate 51.

In the event there are two separate farming implements on the tractor, the next program signal will apply a voltage to lines P1, P2 and P3 to close gate 52 thereby applying a signal through line 69 to a second implement control 70 removing the second implement from the earth.

At this point the tractor has been throttled down and the implement(s) removed from the earth. The apparatus therefore is in condition to commence its turn toward the next row and, if such turn is to be to the left, the program unit then applies a voltage to line P1 alone, causing the multivibrator outputs A, B', C' to open AND gate 46 to actuate motor 54 in the manner described above with shaft 58 rotating to turn the tractor to the left.

The tractor is then caused to continue in a generally straight line along line 24b for a predetermined distance until a second pulse P1 appears which is passed to the steering motor 54 in the same manner described above, causing the tractor to again turn to the left so that it is positioned in substantially the proper direction for the farming operation.

Approximately at this time, the actuated implement control means 66 lowers the first implement into the earth, and shortly thereafter implement control 70 lowers the second implement into the earth. By the nature of these operations it is a simple matter to cause the raising and lowering of the implements to be controlled by a single pulse.

As the tractor continues toward the field it once again crosses the wire 22b. The second consecutive crossing causes a pulse to appear on line P3 which is passed to multivibrator 44 whereby an A', B', C signal opens AND gate 48 to throttle motor 56 which then re-opens the throttle to bring the tractor up to the desired speed. The program unit is then removed from the circuit, and the previously described tracing circuit reinserted by closure of relay contacts 58 and 60. Accordingly, the antenna coils 16a and 16b seek the line 14 and the entire tracing operation, as previously described, continues.

When the tractor reaches the other edge of the field and crosses the line 22a, substantially the same thing occurs with the exception that the tractor is turned to the right instead of the left. In other words, where signal P1 appeared in the previous explanation, there now occurs signal P2 which is passed through OR gate 47 to energize motor 54 in the reverse direction. This right-left alternation continues until the entire area has been farmed.

A drawback of prior art automatic farming apparatus is the general inability to vary a preset sequence or tracing pattern without actually resorting to manual control. Accordingly, a feature of the present invention is remote control means cooperating with the tracing and program control circuits to permit the entire farming operation to take place without any direct human control of the tractor.

According to the invention, each tractor also includes means for receiving multi-frequency signals from a remote transmitter. Thus, in FIGURE 2 a radio receiving antenna is shown at 74 with its output coupled to a receiver 76. The output of receiver 76 is coupled to four gated selective amplifiers 78, 79, 80 and 81 each of which produces a direct voltage only if the frequency to which it is tuned is applied to its input. Such amplifiers are well known. It is recalled that the invention is designed to have utility with a plurality of tractors. Accordingly, each of the tractors has a separate tone or frequency to which it responds. In the illustrated case amplifier 78 is tuned to a particular frequency and, in response thereto, will energize an override circuit 82. The override circuit 82 has an output which is coupled to the amplifiers 79, 80 and 81 to gate these amplifiers open so that they pass their respective signals (if present) to their outputs. Simultaneously, the automatic override circuit 82 couples a signal to comparator 32 to override any of the signals which may be received by the tracing antenna 16a and 16b.

Amplifiers 79, 80 and 81 are each tuned to a different frequency, and these frequencies also differ from the frequency of amplifier 78. The outputs of the amplifiers are coupled to the OR gates 34, 36 and 38, respectively, so that by transmitting selected combinations of the frequencies, it is possible to energize any combination of multivibrators 40, 42 and 44 to thereby initiate the operations previously described. In addition, for the remote control purposes, an AND gate 50 is coupled to a flip flop 84 which is adapted to energize a motor 86 to disengage and subsequently engage the clutch of the tractor.

If the frequency $F_d$ is present in the output of the heterodyne receiver 76, amplifier 78 will cause the override circuit 82 to gate open the amplifiers 79, 80 and 81. At the same time, all other control modes will be overridden. The individual at the transmitter station may operate the tractor in any desired way. For example, if he wishes to steer a tractor to the left, frequency $F_a$ is transmitted along with the frequency $F_d$, in which case only amplifier 79 will produce an output. This output is coupled through OR gate 34 to multivibrator 40 so that the multivibrator outputs A, B', C' are passed through AND gate 46 to the steering motor 54. If the operator wishes to engage the clutch, a transmitter button is pressed to send frequencies $F_a$ and $F_b$ along with the carrier $F_d$. Accordingly, the multivibrator outputs A, B, C' will be passed through AND gate 50 to actuate the clutch motor 86. Similarly, it can be seen that depending upon the combination of frequencies transmitted any one of the gates 46–52 will be opened to actuate its associated control means.

The frequencies $F_a$, $F_b$, and $F_c$ will be common to all of the tractors regardless of the number used. Each tractor will have a separate amplifier corresponding to amplifier 78 tuned to a separate frequency, such as $F_e$, $F_f$, etc. When it is desired to operate any one or more of the tractors it is merely necessary to transmit the tone corresponding to that particular tractor; the functions served by the various combination of tones $F_a$, $F_b$ and $F_c$ will, of course, be the same in all cases.

FIGURE 3 is a block diagram of the programming unit which produces the pulses P1, P2, and P3.

As in the case of the block diagram of FIGURE 2, the components of FIGURE 3 are well known in the electronic arts and many equivalent constructions may be used to obtain the same results.

In FIGURE 3, the various flip-flops are shown as having two inputs labelled S and R and two outputs labelled "1" and "0." Each flip-flop is a bistable device which will switch from whichever state it is in to the opposite state upon application of a pulse to the S input. Upon application of a pulse to the R input the flip-flop will be reset to its "0' state, i.e. the high signal apears at the "0" output. The construction of such flip-flops is well known.

The antenna 25 at the center of the tractor (see FIG. 1) picks up the signal on lines 22a or 22b and couples it through a tuned appilfier 90 to a detector 92. If the amplitude detected is above a predetermined threshold, detector 92 sets flip flop 94 to its "1" state thereby generating the program pulses P1 and P3 to cause the throttle down operation to commence.

The "1" output of flip flop 94, which is coupled through an adjustable delay 98 to the set input of a second flip flop 100, sets flip flop 100 to its "1" state. This change in state of flip-flop 100 is sensed by a pulse forming circuit 101 which produces the program pulses P2 and P3 causing the first implement to be raised from the ground. Similarly, the "1" output of flip flop 100 is fed through a second adjustable delay 102 to the set input of a flip flop 104 to generate the program pulses P1, P2 and P3 through a pulse former 105 and remove the second implement from the earth. The pulse formers 101 and 105 may be any of a variety of known devices and serve to convert the change in state from "0" to "1" of their associated flip flops to a voltage of predetermined duration to operate the implement raising apparatus. For example, the pulse formers may comprise a differentiating circuit followed by a monostable multivibrator.

These operations occur relatively quickly after the line 22a has been passed, and the delays 98 and 102 may be adjusted depending upon the particular environment in which the invention is used.

The "1" output of flip flop 104 is coupled to the set input of a flip flop 106 causing a signal to appear on the "1" output of the latter which is coupled to a pulse generator 110. Pulse generator 110 produces a pulse corresponding to the pulse P1 which will last for a fixed interval of time so that the first right turn operation (for example) can take place along the path 20a of FIGURE 1.

The pulse generator 110 generates program pulse P1 for a predetermined interval of time which also will be calculated in an obvious manner depending upon the environment and distances between the respective wires 22 and 24. After this first right turn operation has ceased, the tractor commences tracing along the line 24a. This operation is carried out by virtue of antenna 26 which during this phase of the operation serves the functions previously described with respect to antenna sections 16a and 16b. Thus, antenna 26 may include two similar sections coupled to a comparator (not shown) and respective tuned amplifiers (not shown) just as illustrated in FIGURE 1, with the comparator outputs fed to respective additional input lines of OR gates 34 and 36. Accordingly, when the first right turn operation has ceased, the antenna 26 immediately commences to seek line 24a or b, as the case may be, and the tractor follows the path defined by that line.

As shown in FIGURE 3, the "1" output of flip flop 104 also sets a flip flop 112, the "1" output of which is coupled through a delay unit 114 to pulse generator 110. Accordingly, a predetermined time after the first right turn operation (as determined by the amount of delay inserted by delay 112), flip flop 114 is set to again energize the pulse generator 110. This again causes the generation of a program pulse P1 so that a second steer right operation takes place along the line 20c.

The program unit of FIGURE 3 may also include means to cause the automatic steering operation to be overridden during the presense of pulses P1 (and P2) which cause the programmed steering operation. Thus, for example, the output of generator 110 may energize a relay (not shown), the contacts of which are adapted to disconnect antenna 26 from its associated comparator.

As this point in the operation, the tractor is traveling along the path 20d and about to cross the line 22a for the second time. When this second crossing occurs, antenna 25 detects the signal which causes flip flop 94 to be set to its "0" state. When flip flop 94 is reset, it produces at its output the program pulse P3 which increases the tractor throttle, returning the tractor to its normal speed. At the same time, the "0" output of flip flop 94 resets flip flops 100 and 104 so that these flip-flops are in condition to raise the implements when the antenna 26 crosses the opposite line 22b.

When the tractor crosses the wire 22b at the opposite edge of the field, the throttle down and implement raising program pulses are produced as described above. This time, however, the "1" output of flip flop 104 will cause the flip flops 106 and 114 to switch to their "0" states so that pulse generator 118 produces the delayed program pulse P1 to cause the tractor to be steered left. The operation of the tractor in all other respects is the same and continues over the entire area being farmed whereby the tractors turn alternately right and left, twice each, at each edge of the field.

FIGURE 4 is a diagram used to illustrate the manner in which a particular area would be farmed with three tractors. The wires illustrated in FIGURE 1 at 14 and 22 are identically numbered in FIGURE 4.

In FIGURE 4 three different cross hatched areas are shown with each area corresponding to that portion of the field which would be covered by a given tractor. Each tractor is hauling an implement capable of farming four rows at a time, there being twelve rows between the wires 14a, 14b, etc. As shown in FIGURE 4, it requires only a single pass of all three tractors to farm the entire area. The fact that one or more tractors may have to follow the seek and hold line 24 (FIGURE 1) for a longer period of time when turning in one direction than it does when turning in the other direction presents no problems because the delay of each of the adjustable delay units 114 and 115 (FIGURE 3) may be separately varied for this purpose.

The twelve row spacing between the parallel lines 14 is particularly desirable since it permits operation of equipment having any width (in rows) divisible into 12. Accordingly, with few minor exceptions all of the implements presently in general use could be used. The lines 14a, 14b, etc., should be approximately forty feet apart (assuming forty inch row widths) and the lines 24 may be approximately twenty feet from the parallel lines 22.

The dimensions given above will vary depending upon many conditions and no effort has been made herein to exhaust the possible configurations. Similarly, the circuits have been illustrated in block diagram form since in each case well known commercially available equipment may be used. By way of further example, the individual delay units may comprise relays adapted to actuate their associated contacts a predetermined (adjustable) interval after the relay coil is energized.

The apparatus for raising and lowering the implements may be of the type described in U.S. Patent No. 3,169,598 of Finn-Kelcey or any other construction. Moreover, the specific guidance system employed is not a feature of the invention; for example, the guidance system disclosed for use with road vehicles in U.S. Patent No. 3,033,305 assigned to General Motors Corporation would have utility with the present invention. Other alternative constructions for the various subcombinations of the present invention may be found in U.S. Patent No. 2,842,039 of Swingle.

FIGURE 5 is a block diagram of a transmitting unit which may be used for the remote control functions of the tractor. The transmitter includes a master oscillator 130 and seven audio oscillators 132a, 132b . . . 132g. A switching and mixing circuit 134 is responsive to the output of all seven oscillators 132.

It is recalled that depending upon the combination of frequencies transmitted various operations of the tractor can be controlled. These frequencies are generated by oscillators 132a, b and c. The remaining audio oscillators are used to enable the remote control apparatus and the individual tractors. Thus, with the circuit illustrated, it would be possible to control seven different operations of four separate tractors.

The output of master oscillator 130 is fed through a buffer 136 and intermediate power amplifier 138 to an output power amplifier 140 coupled to a transmitting antenna 141. The combined frequencies from the selected oscillators 132 are coupled through circuit 134 to an audio amplifier 142 and modulator 144, the output of which modulates the master oscillator frequency. It will be apparent to those skilled in the art that the transmitter construction illustrated in FIGURE 5 is conventional.

The choice of the various frequencies will be dictated solely by practical considerations. A convenient frequency to employ for the tracing on lines 14 is 10 kc. Whether or not it will be possible to use this frequency also on the lines 24 will depend upon the particular configuration and equipment used.

Various other features may be incorporated into the invention. For example, a throttle control sensor adapted to ride on the ground may be used to retard the throttle automatically and increase it after a short time interval when the tractor approaches a water furrow. Safety circuits may also be incorporated into the system. Thus, apparatus responsive to a failure in oil pressure, hydraulic pressure, generative failure or even a malfunction in the automatic or program steering function may be adapted to inhibit further operation of the tractor.

What is claimed is:

1. Automatic earth-working apparatus, wherein a vehicle having a working implement attached thereto is adapted to trace a buried conductor over a desired path and wherein there is provided steering means for steering said vehicle, implement means for raising and lowering said implement, and throttle means for adjusting the throttle of said vehicle, and wherein an additional conductor is buried for the purpose of aiding in controlling the turning of said vehicle, the improvement comprising
   means for producing a first electrical signal when said vehicle is to the right of said path,
   means for producing a second electrical signal when said vehicle is to the left of said path,
   control means responsive to detection of said additional wire for producing control pulses,
   means responsive to said control pulses and said first and second electrical signals for providing a plurality of parallel digital signals, and
   gating means responsive to different preselected combinations of said digital signals for energizing said steering means, implement means, and throttle means.

2. Automatic earthworking apparatus according to claim 1, including radio receiver means adapted to receive one or more of a plurality of preselected frequencies, said radio receiver means including means for producing a plurality of second control pulses corresponding to respective ones of said frequencies, and means coupling said second control pulses to said digital signal providing means for controlling said steering means, implement means, and throttle means.

3. Automatic earthworking apparatus according to claim 1, wherein said control means produces control pulses which are delayed in time with respect to others of said control pulses thereby causing said digital signal providing means to produce successive different combinations of said parallel digital signals to sequentially operate said steering means, implement means, and throttle means.

4. Automatic earthworking apparatus according to claim 1, wherein said control means produces control pulses which are delayed in time with respect to others of said control pulses thereby causing said digital signal providing means to produce successive different combinations of said parallel digital signals to sequentially operate said steering means, implement means, and throttle means.

References Cited

UNITED STATES PATENTS

| | | | |
|---|---|---|---|
| 2,842,039 | 7/1958 | Swingle | 172—23 X |
| 2,847,080 | 8/1958 | Zworykin et al. | 180—79.1 X |
| 2,859,426 | 11/1958 | Davis | 180—79.1 X |
| 3,294,178 | 12/1966 | Lawson et al. | 172—3 |

FOREIGN PATENTS 559,154  6/1958  Canada.

ANTONIO F. GUIDA, Primary Examiner
STEPHEN C. PELLEGRINO, Assistant Examiner